United States Patent
Nagatsuka et al.

(10) Patent No.: US 7,458,692 B2
(45) Date of Patent: Dec. 2, 2008

(54) PROJECTOR APPARATUS

(75) Inventors: Kazuyoshi Nagatsuka, Kanagawa (JP); Nobutomo Tanaka, Kanagawa (JP)

(73) Assignee: D & M Holdings, Inc., Kawasaki-shi, Kanagawa (JP)

( * ) Notice: Subject to any disclaimer, the term of this patent is extended or adjusted under 35 U.S.C. 154(b) by 0 days.

(21) Appl. No.: 11/794,263

(22) PCT Filed: Aug. 11, 2005

(86) PCT No.: PCT/JP2005/014780

§ 371 (c)(1),
(2), (4) Date: Jun. 27, 2007

(87) PCT Pub. No.: WO2006/077671

PCT Pub. Date: Jul. 27, 2006

(65) Prior Publication Data

US 2008/0007701 A1 Jan. 10, 2008

(30) Foreign Application Priority Data

Jan. 19, 2005 (JP) ............................. 2005-012124
Mar. 4, 2005 (JP) ............................. 2005-060049

(51) Int. Cl.
*G03B 21/14* (2006.01)

(52) U.S. Cl. ........................................ 353/101; 353/46

(58) Field of Classification Search ................. 353/69, 353/70, 101, 46, 119

See application file for complete search history.

(56) References Cited

U.S. PATENT DOCUMENTS

| 7,322,701 B2 * | 1/2008 | Kamimura et al. ............ 353/69 |
| 2004/0080836 A1 | 4/2004 | Miyashita et al. |

FOREIGN PATENT DOCUMENTS

| JP | 7-123054 | 5/1995 |
| JP | 9-138377 | 5/1997 |
| JP | 2002-72351 | 3/2002 |
| JP | 2003-185902 | 7/2003 |
| JP | 2003-315917 | 11/2003 |
| JP | 2003-330116 | 11/2003 |
| JP | 2004-20622 | 1/2004 |
| JP | 2004-317988 | 11/2004 |

* cited by examiner

*Primary Examiner*—William C. Dowling
(74) *Attorney, Agent, or Firm*—Dickstein Shapiro LLP

(57) ABSTRACT

A projector apparatus, comprising a light converging unit (14) for converging image light for formation of a predetermined image; a lens unit (4) for passing through the image light from the light converging unit (14) so that an image of a predetermined magnification is displayed on a screen; a moving unit (5) for changing a relative distance between the light converging unit (14) and the lens unit (4) to adjust a position of the image displayed on the screen by the lens unit (4); and a control unit (6) for determining whether or not the relative distance changed by the moving unit exceeds a predetermined amount.

7 Claims, 10 Drawing Sheets

PROJECTOR APPARATUS

TECHNICAL FIELD

The present invention relates to projector apparatuses, and in particular to a projector apparatus capable of changing a position on a screen to which an image is projected.

BACKGROUND ART

In recent years, commercial use projector apparatuses, in particular, become larger and heavier, following the trend of projecting larger images and enhancing the quality thereof. Such large and heavy projector apparatus cannot usually be easily moved once installed.

With such background, Japanese Patent Laid-open Publication No. Hei 9-138377, for example, discloses a structure capable of changing a relative distance between the central line of the luminous flux of image light and the optical axis of the lens unit so that an image can be projected onto a desired position on the screen from the projector apparatus with a main body thereof fixedly installed. This structure can slide the position on the screen, onto which the image light is projected from the projector apparatus.

According to such a projector apparatus, when the central line of the incident light coincides with the optical axis of the lens unit, that is, the distance between the central line and the optical axis is zero, the luminous flux of image light and the optical axis of the lens are perpendicular to the screen. With the above, an image as initially desired is shown, giving no sense of discomfort to the viewer. Thus no problems at all are caused.

However, when the central line of the incident light does not coincide with the optical axis of the lens unit, producing a relative distance therebetween, an angle results between the optical axis of the lens unit and the optical axis of the projected light from the lens unit towards the screen. In the above, the optical axis of the projected light forms an angle relative to the direction perpendicular to the screen. That is, the projected light reaches the screen with the optical axis thereof diagonal to the direction perpendicular to the screen. This results in an image that is different from the one initially desired being shown on the screen. Specifically, as shown in FIG. 12, the angle of view is distorted; the overall brightness is inconsistent; and blur expands due to the focus not being properly adjusted. The larger the relative distance between the central line of the incident light and the optical axis of the lens unit becomes, in other words, the larger the distance between the point where the optical axis of the lens unit contacts with the wall on which the screen provided thereon and the image actually shown on the screen becomes, the more serious the above-described problem of distortion and/or blur becomes. Consequently, only a part of the light from the condenser is directed to the lens unit, and an image with parts missing thus results.

Here, when the slide amount of the image on the screen is small, the distortion and blur of the image may be practically tolerable. However, with the image sliding excessively, the viewer of the image may recognize obvious distortion and/or blur of the image, which could be a practical problem.

As described above, the above-described projector apparatus has a possibility that positional adjustment of an image on the screen may result in distortion and blur of the image, which are large enough to cause a practical problem. The present invention aims to address this deficiency.

DISCLOSURE OF THE INVENTION

This invention has been conceived in view of the above, and according to one aspect of the present invention, there is provided a projector apparatus, comprising a light converging unit for converging image light for formation of a predetermined image; a lens unit for passing through the image light from the light converging unit so that an image of a predetermined magnification is displayed on a screen; a moving unit for changing a relative distance between the light converging unit and the lens unit to adjust a position of the image displayed on the screen by the lens unit; and a control unit for determining whether or not the relative distance changed by the moving unit exceeds a predetermined amount. With the projector apparatus, it is possible to determine in advance the occurrence of significant distortion and/or blur which are large enough to cause a practical problem.

The projector apparatus described above may further comprise a detection unit for outputting a signal when the relative distance exceeds the predetermined amount, wherein the control unit may determine whether or not the relative distance exceeds a predetermined amount, based on the signal output from the detection unit. With the detection unit, it is possible to determine in advance the occurrence of significant distortion and/or blur.

The projector apparatus described above may further comprise a measurement unit for detecting the relative distance, wherein the control unit determines whether or not the relative distance detected by the measurement unit exceeds a predetermined amount. With the measurement unit, it is possible to determine in advance the occurrence of significant distortion and/or blur.

According to the above-described projector apparatus, an alert may be put out when the control unit determines that the relative distance exceeds the predetermined amount. With the alert, it is possible to determine in advance the occurrence of significant distortion and/or blur.

According to the above-described projector apparatus, an image containing an alert may be displayed when the control unit determines that the relative distance exceeds the predetermined amount. With the above, it is possible to readily determine in advance the occurrence of significant distortion and/or blur.

According to the above-described projector apparatus, an image having a predetermined area thereof deleted may be displayed when the control unit determines that the relative distance exceeds the predetermined amount. With the above, it is possible to display an image with little distortion and/or blur.

According to the above-described projector apparatus, an image to be displayed having a predetermined area thereof expressed in black may be displayed when the control unit determines that the relative distance exceeds the predetermined amount. With the above, it is possible to display an image with little distortion and/or blur.

BRIEF DESCRIPTION OF THE DRAWINGS

Exemplary embodiments of the present invention will be described in detail based on the following figures, wherein.

BEST MODE FOR CARRYING OUT THE INVENTION

In the following, embodiments of the present invention will be described with reference to the accompanying drawings, though the present invention is not limited to the following embodiments.

FIRST EMBODIMENT

Figure 1:
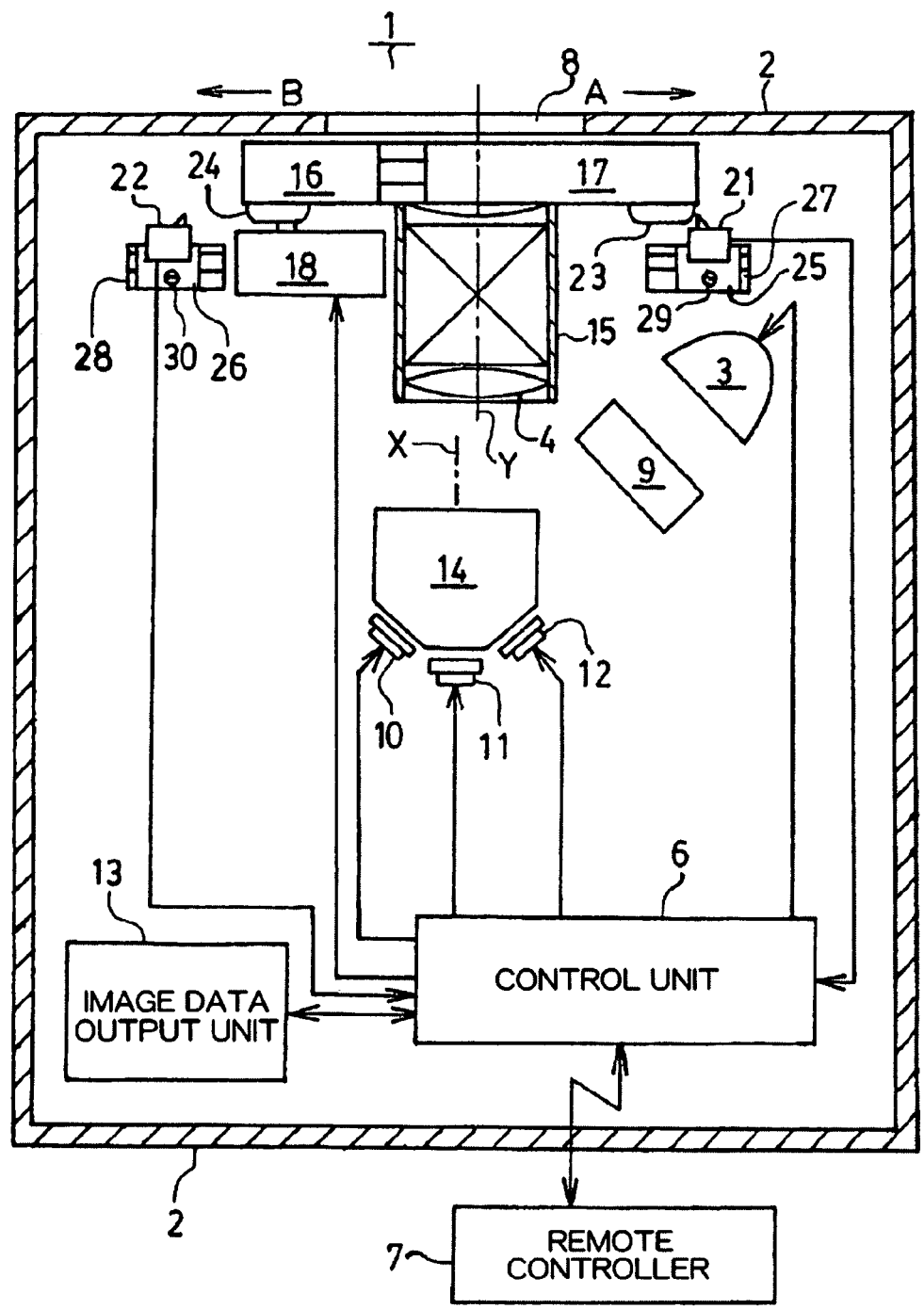
FIG. 1 is a plane disposition diagram showing a structure of a projector apparatus according to a first embodiment of the present invention.

FIG. 1 shows a structure of a projector apparatus 1 according to a first embodiment. As shown in FIG. 1, the projector apparatus 1 comprises a control unit 6, a casing 2, a light source 3, and a lens unit 4.

The control unit 6 controls an overall operation of the projector apparatus 1, and can receive an instruction from the operator and operate accordingly. An instruction from the operator is input via the remote controller 7. The remote controller 7 can be removed from and attached to the casing 2 to be described later, and serves, when mounted to the casing 2, as an operating device of the main body of the projector apparatus 1, and when separated from the casing, as a remote controller. Obviously, a separate operating device may be mounted to the casing 2 to be described later. The remote controller 7 has a cursor button, or the like, and is used to input an instruction to slide the slider member 16, to be described later, for positional adjustment of the image on the screen.

The casing 2 is a part of the main body of the projector apparatus 1. The casing 2 has an opening 8 defined substantially at the middle on one side surface thereof, for passing the image light through. In use, the projector apparatus 1 is disposed such that the opening 8 is directed to the screen.

The light source 3 outputs white light for projection, and is turned on and off to output the white light under control by the control unit 6. The light from the light source 3 is processed so as to produce image light to form a desired image on the screen. Specifically, the light from the light source 3 is processed by the spectroscope 9, the digital micromirror devices 10, 11, 12 (hereinafter referred to as "DMD's"), and an image data output unit 13 before being converged by the condenser 14.

The spectroscope 9 receives the white light from the light source 3, and divides the received light into light rays of three colors, that is, primary color light rays of red (R), green (G), and blue (B).

The DVD's 10, 11, 12 receive a drive signal from the control unit 6, and based thereon, receive the primary color light rays of red (R), green (G), and blue (B), respectively, from the spectroscope 9, and reflect the light for formation of a predetermined image towards the lens unit 4.

The image data output unit 13 outputs an image data signal about an image. That is, in response to a request signal from the control unit 6, the image data output unit 13 sends a corresponding image data signal to the control unit 6. Based on the received image data signal, the control unit 6 controls the reflection by the DMD's 10, 11, 12 so as to reflect light rays for formation of a predetermined image.

The condenser 14 receives the light rays of red (R), green (G), and blue (B) from the DMD's 10, 11, 12, then converges the light rays into an image light bundle, and outputs the converged light towards the lens unit 4.

The lens unit 4 comprises a plurality of lenses held in a predetermined order at a predetermined interval by a barrel 15. The lens unit 4 passes the light from the condenser 14 to thereby form image light of a desired magnification. The output end of the lens unit 4 projects outside the casing 2 through the opening 8, and outputs the image light of the predetermined magnification towards the screen.

The condenser 14 outputs the converged light towards the lens unit 4 such that the central line X (optical axis) of the light remains parallel to the Y axis (optical axis) of the lens unit 4. The lens unit 4 is constructed capable of changing the distance relative to the condenser 14.

Figure 2:
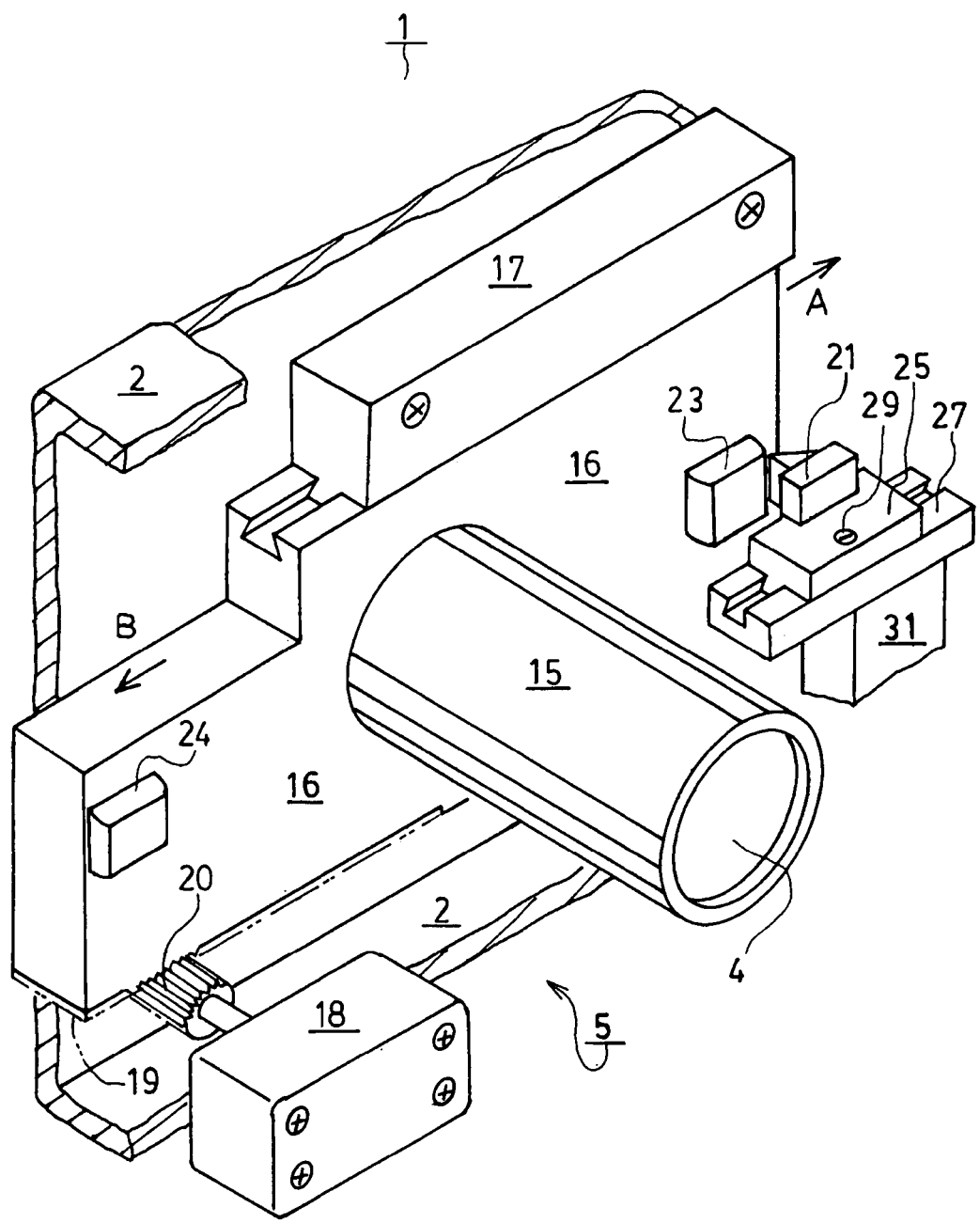
FIG. 2 is a perspective view showing a structure of a part of the projector apparatus, the part being in the vicinity of the lens of the projector apparatus according to the first embodiment of the present invention.

FIG. 2 shows one example of a structure of a part of the projection apparatus 1, the part being in the vicinity of the lens unit 4 of the projection apparatus 1. In the example shown, the moving unit 5 can slide the lens unit 4. The moving unit 5 can also change the relative distance between the optical axis X of the image light from the condenser 14 and the optical axis Y of the lens unit 4 by a desired amount.

In the example shown, the moving unit 5 comprises a stator member 17, a slider member 16, a geared motor 18, a rack gear 19, and a pinion gear 20. The stator member 17 is fixedly mounted by means of a screw to the casing 2. The slider member 16 is engaged with the stator member 17, and holds the barrel 15. The geared motor 18 causes the slider member 16 to slide in the directions indicated by the arrows A and B (directions A and B). The rack gear 19 is mounted to the slider member 16. The pinion gear 20 is mounted to the output shaft of the geared motor 18.

The rotating geared motor 18 under control by the control unit 6 can cause the slider member 16 and the barrel 15 (lens unit 4) mounted thereto to slide. Under control by the control unit 6, the moving unit 5 can cause the lens unit 4 to slide relative to the condenser 14 in the directions A and B in the drawing. The structure of the moving unit 5, however, is not limited to the above, and any structure capable of changing the relative distance between the lens unit 4 and the condenser 14 is applicable.

As described above, the use of the moving unit 5 makes it possible to change by a desired amount the relative distance between the optical axis X of the image light from the condenser 14 and the optical axis Y of the lens unit 4. Consequently, the image projected onto the screen can move a distance corresponding to the slide direction of the lens unit 4 by the slide amount thereof. For example, the operator viewing the image shown on the screen designates the slide amount for positional adjustment when the image is not in an appropriate position, by operating the remote controller 7. Based on the designated slide amount, the control unit 6 controls the moving unit 5 so as to slide the lens unit 4 by the designated amount, whereby the displaced image on the screen can be adjusted.

However, the optical axis Y of the lens unit 4 and the optical axis X of the image light from the condenser 14 are relatively too far apart from each other, and problems may arise, depending on the relative distance, or an isolation distance between the optical axes X and Y, including a distorted angle of view of the image shown on the screen, inconsistent brightness over the entire image, and expanding blur of the image due to the image light not being focused on the screen. The blur becomes larger with the isolation distance becoming larger, and so forth.

Therefore, with the isolation distance between the optical axes X and Y (that is, the slide amount of the slider member 16) exceeding a predetermined amount, the projector apparatus 1 according to this embodiment alerts the operator. With the alert, the operator can know the presence of distortion of the angle of view of the image on the screen, deteriorated brightness consistency over the entire image, expanding blur of the image, and so forth, when adjusting the image position on the screen.

Here, it should be noted that it is described in the above that the distorted angle of view of the image on the screen, inconsistent brightness over the entire image, and expanding blur of the image are recognized when the optical axis Y of the lens unit 4 moves apart from the central line X of the image light from the condenser 14. To be more precise, in actual fact the distorted angle of view, the inconsistent brightness, and the expanding blur of the image appear in the marginal portion of the image in the sliding direction on the screen. However, as the viewer viewing the image perceives the image as a whole through his/her senses, the expression that the distorted angle of view, inconsistent brightness, expanding blur of the image appear only in the marginal portion in the sliding direction of the image on the screen is not used here.

In the following, a structure for alerting in this embodiment will be described while referring to the accompanying drawing.

As shown in FIGS. 1 and 2, the projector apparatus 1 according to the embodiment comprises limiters 21, 22, and pressing bodies 23, 24.

While referring to FIG. 2, the limiter 21 is mounted to a slider 25 having a convex portion. The slider 25 is disposed fitting into the groove of the stator 27, and fixed by means of a clamping screw 29. The stator 27 is mounted on a support member 31 erected on the base of the casing 2. Similarly, the limiter 22 is fixedly disposed on the casing 2 by means of the slider 26, the stator 28, the clamping screw 30, or the like (see FIG. 1 as this is not shown in FIG. 2).

As shown in FIG. 1, the limiters 21, 22 are disposed in the vicinity of both ends of the area where the slider member 16 can slide. The limiters 21, 22 are positioned so as to initiate a switching operation upon receipt of an urging force by pressing bodies 23, 24.

The grooves of the stators 27, 28 are formed substantially parallel to the slide direction of the slider member 16, so that the sliders 25, 26 can slide in the directions A and B with the clamping screws 29, 30 slightly unscrewed, similar to the slider members 16. That is, the positions of the limiters 21, 22 are subtly adjustable by sliding the slider members 25, 26, respectively.

As described above, in positional adjustment of the image on the screen, the control unit 6 controls to slide the slider member 16 in response to an instruction from the operator, to thereby cause the lens unit 4 and the condenser 14 to move closer or farther with respect to each other. In the above, with too large an isolation distance, a distorted angle of view, inconsistent brightness over the entire image, expanding blur, and so forth, are clearly visible with the image on the screen, which could cause a practical problem. The positions of the limiters 21, 22 are determined based on the isolation limitation which ensures tolerable distortion, blur, and so forth. The isolation limitation (tolerance) is empirically determined, specifically, relying on, as a guide post, the amount of distortion, and so forth, perceived as tolerable by a general operator viewing the image on the screen. The limiters 21, 22 are preferably disposed symmetrically with respect to the central line X of the condenser 14.

The pressing bodies 23, 24 are mounted on both ends of the slider member 16, and slide in the directions A and B together with the slider member 16. The limiters 21, 22 detect the urging force by the pressing bodies 23, 24, and produce signals indicative of an ON state.

Specifically, the limiters 21, 22 send a signal indicative of an ON state to the control section 6 when being urged by the pressing bodies 23, 24 due to the slider member 16, which holds the lens unit 4, sliding in the direction A or B.

Based on the signal indicating an ON state from the limiters 21, 22, the control unit 6 detects the slider member 16 having slid in the direction A or B by an amount in excess of a predetermined limit. This means the isolation distance between the central line X of the image light from the condenser 14 and the optical axis Y of the lens unit 4, exceeding a predetermined amount.

The control unit 6, having detected the slider member 16 having slid by an amount exceeding the predetermined amount, alerts the operator, informing to that effect. In this embodiment, the control unit 6 controls to show an image which is modified as predetermined on the screen, to thereby alert the viewer. Specifically, upon receipt of the signal from the limiters 21, 22, the control unit 6 controls the image data output unit 13 so as to output an image signal containing a predetermined alert denotation, and further, based on the image signal from the image data output unit 13, controls the DMD's 10, 11, 12 so as to produce an image containing the alert denotation. The image light modified by the DMD's 10, 11, 12, or the like, is projected via the lens unit 4 towards the screen. The operator adjusting the image, that is, sliding the slider member 16, sees the alert denotation shown. With the above, the operator can know the excessive movement of the slider member 16 beyond the predetermined amount with potential problems including image distortion, inconsistent brightness, blur, and so forth.

In the following, an operation of the projector apparatus 1 in the above-described structure will be described.

Figure 3:
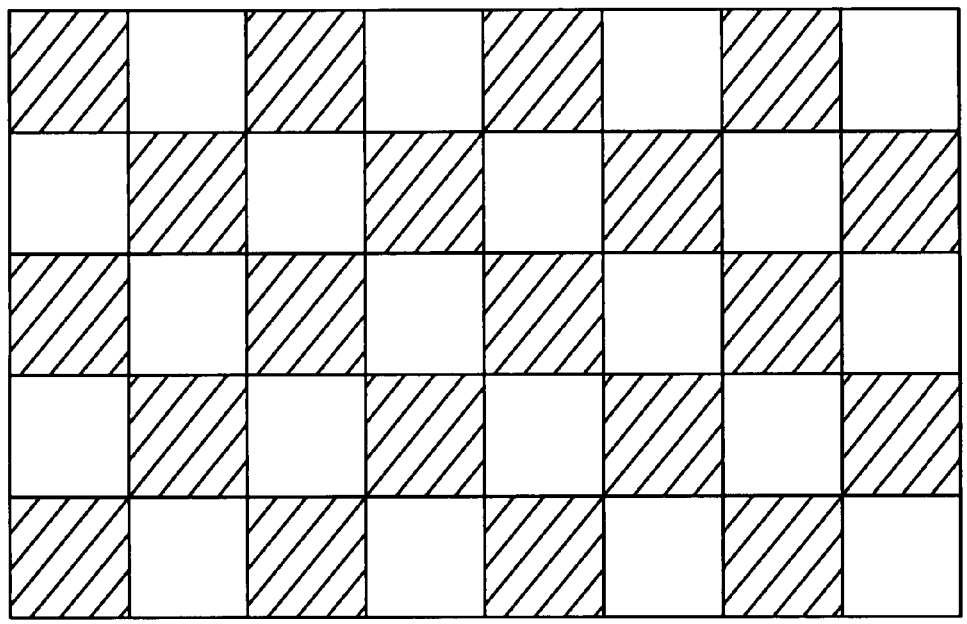
FIG. 3 is a diagram showing a test image.

Initially, the operator installs the projector apparatus 1 at a desired place. Initially, the operator projects a test image for adjusting the angle of view of an image towards the screen disposed as desired to see whether or not the image is projected at a desired position, for example, whether or not the projected image is shown within the screen. For this purpose, when no image data is externally input or an instruction from the remote controller 7 is received, or the like, the projector apparatus 1 projects a test image towards the screen. In this embodiment, as shown in FIG. 3, a black/white grid image pattern is shown on the screen (the diagonal lines represent difference in color in the drawing). The data about the test image is stored in the image data output unit 13, for example.

The operator viewing the test image shown on the screen instructs the projector apparatus 1 to adjust the image, using the remote controller 7, when the image is not positioned as desired. For example, the operator inputs a control signal, via the remote controller 7, instructing to move the image in the direction A by a desired distance on the screen. Having received the control signal, the control unit 6 controls the geared motor 18 so as to drive the pinion gear 20 by an amount corresponding to the desired distance. The geared motor 18, having received the control signal from the controller unit 6, drives the pinion gear 20 to rotate, whereby the rack gear 19 is fed in the direction A.

With the rack gear 19 fed in the direction A, the barrel 15, integral with the rack gear 19, also moves in the direction A by the same distance. In the above, the lens unit 4 held by the barrel 15 also moves in the direction A by the same distance, whereby the optical axis Y of the lens unit 4 moves in the direction A by the same distance relative to the central line X of the image light from the condenser 14. Consequently, the image position on the screen slides in the direction A by the amount corresponding to the movement. The geared motor 18 stops driving after having driven the pinion gear 20 by the instructed amount, upon which moving of the rack gear 19 by the pinion gear 20 stopped in the direction A. Consequently, the barrel 15 stops moving in the direction A. As described above, the image position on the screen is determined as the operator desires, or in the position slid by their desired distance in the direction A from the original position. To move the image position in the direction B, the control unit 6 controls similar to the above.

In the above, suppose that the operator keeps sliding the image position in the direction A. In this case, the geared motor 18 keeps sliding the slider member 16 until the pressing body 23 ultimately reaches the limiter 21. Then, the limiter 21 detects being urged by the pressing body 23, and sends a signal indicating an ON state to the control unit 6.

The control unit 6, upon receipt of the signal from the limiter 21, controls to show an image which contains an alert denotation, informing the possibility of causing distortion of the angle of view, inconsistent brightness, and blur of the image on the screen to an extent in excess of a predetermined limit.

Figure 4:
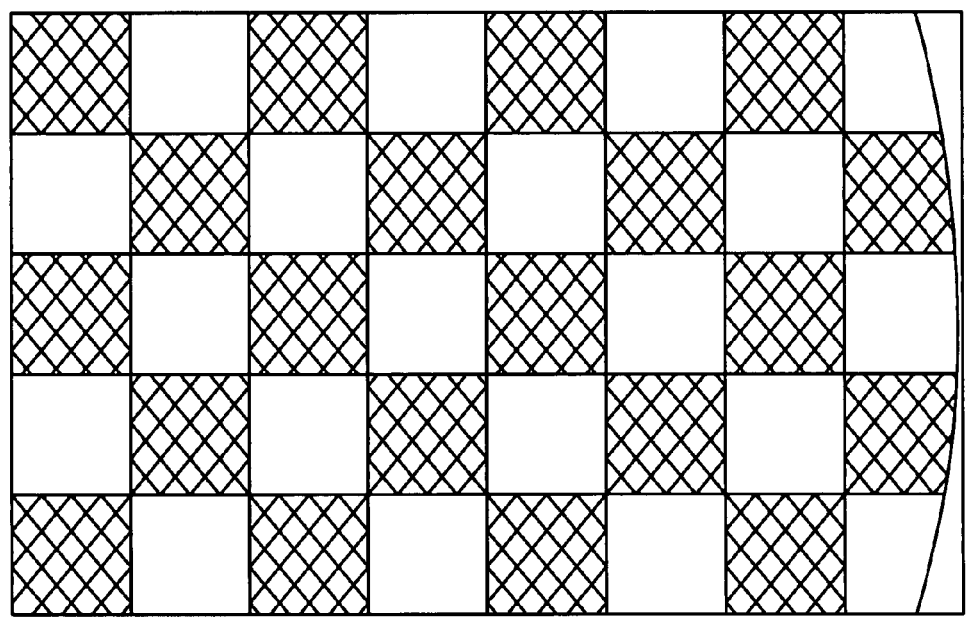
FIG. 4 is a diagram showing a test image for alerting.

Specifically, the control unit 6, having received the signal, obtains an image for an alert denotation, or an image different from a normal image, from the image data output unit 13, for example, a signal of an image of a black/green grip pattern, such as is shown in FIG. 4 (the diagonal lines represent difference in color in the drawing). The image signal for an alert denotation may be stored in other internal memory. Based on the obtained image signal, the control unit 6 controls the DMD's 10, 11, 12 to produce image light containing the alert denotation, and to project the produced image light towards the screen. The operator noticing the black/white grid test pattern shown on the screen, the color of which is changing to black/green, knows that the image has moved by an amount in excess of a predetermined amount.

The operator is informed in advance by means of a manual, or the like, of the possibility that distortion and/or blur of a more than tolerable extent for a typical operator may occur to the image shown on the screen when the test image shown is slid by an amount in excess of a certain amount. The operator is also informed in advance by means of a manual, or the like, that an alert will be put out, should the extent of distortion and/or blur exceed the tolerable level during positional adjustment. In this embodiment, the operator is informed in advance that, as an alert, the color of the grid pattern of the test image will change. Thus, the operator can readily realize the situation.

With an alert put out, the operator determines whether to slide the image on the screen further, to stop the image sliding at the position, or to return the image to its original position. That is, the operator having recognized, by means of the alert, the situation with a potential problem of image distortion, and so forth, carefully observes the image distortion, inconsistent brightness, and blur by themselves, and determines if these are tolerable. Then, the operator determines the slide amount of the image based on their own determination.

As described above, in this embodiment, the operator can reliably know the occurrence and/or possibility of expansion of image distortion and/or blur beyond a predetermined extent due to the positional adjustment of the image shown on the screen, and can carefully adjust the image position with reference to the general tolerance. Further, the operator can have correct knowledge that the distortion and/or blur may occur to the image subjected to positional adjustment due to the positional adjustment itself, rather than the deficient performance of the projector apparatus 1, thus having no problem in specifying the true cause of the deficiency. This is also beneficial for the manufacturer of the projector apparatus 1 as the manufacturer can avoid inquiries from operators and deterioration of the reputation of their products.

The present invention is not limited to the above-described embodiment, and can be modified in many ways.

For example, in the above-described embodiment, the sliders 25, 26, respectively holding the limiters 21, 22, are fixed to the stators 27, 28, respectively. Alternatively, a feed screw mechanism may be provided so that the sliders 25, 26 can readily change their positions relative to the stators 27, 28, respectively.

Further, in the first embodiment, the slide amount is determined using a physical method. Alternatively, the slide amount may be determined based on the amount by which the geared motor 18 drives the slider member 16 or the instructed driving amount.

Figure 5:
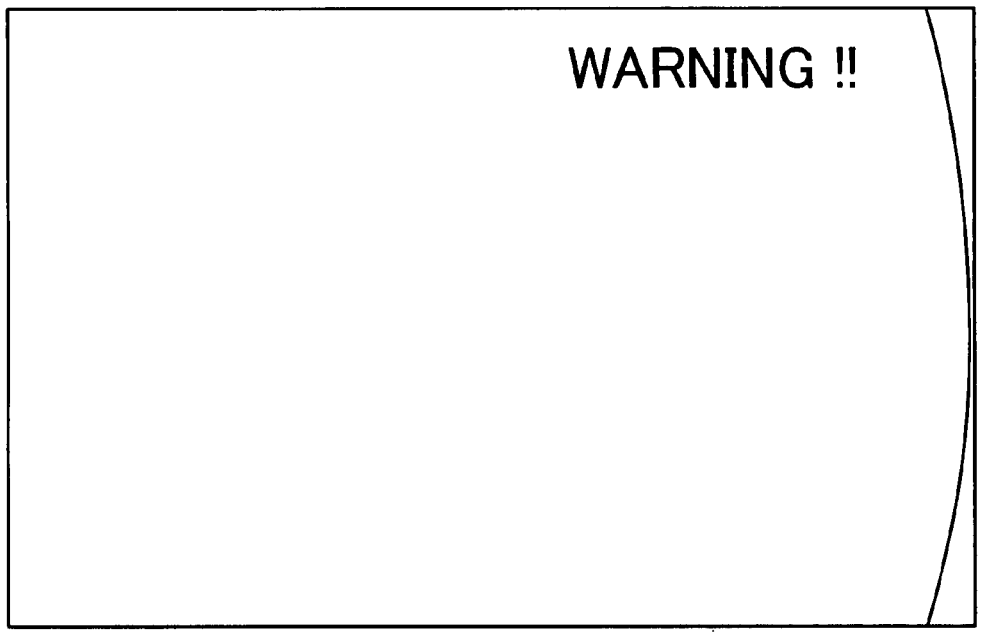
FIG. 5 is a diagram showing an example image displayed for alerting.
Figure 6:
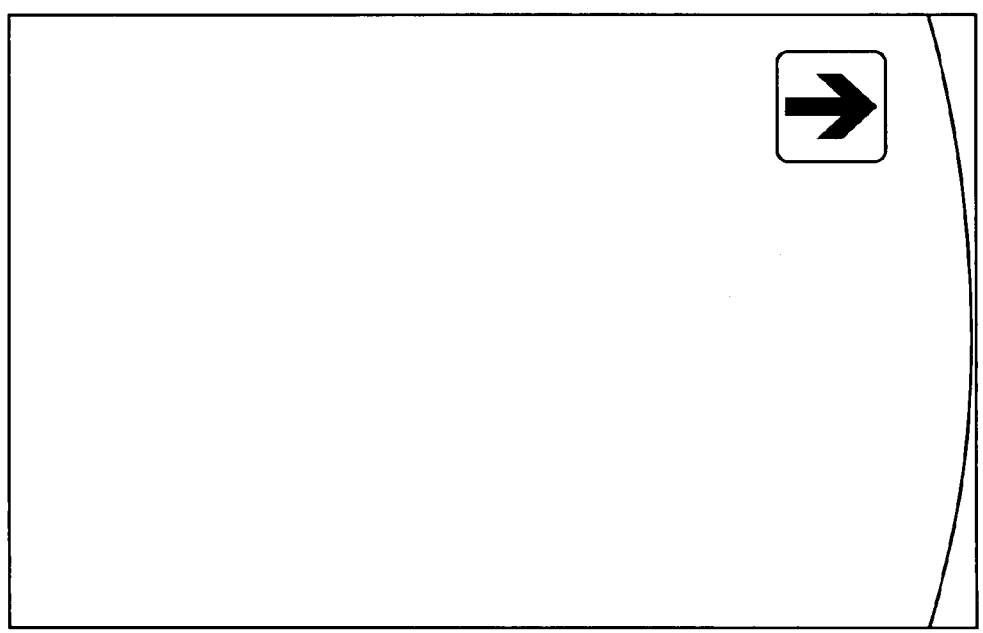
FIG. 6 is a diagram showing an example image displayed for alerting.

Still further, in the above-described embodiment, an alert is put out when adjusting a viewing angle adjustment test image. This, however, is not an exclusive example, and the alert may alternatively be put out when projecting an externally input image. In this case, with the image moved by the operator by an amount beyond the predetermine amount, a caution, such as "WARNING!!", or the like, as shown in FIG. 5, an icon drawing attention, such as is shown in FIG. 6, or the like, may be displayed superimposed on the image to be displayed. That is, upon receipt of a signal from the limiters 21, 22, the control unit 6 controls the image data output unit 13 so as to add image data representing caution or the alert icon to the image signal being output. The image data representing the caution or the alert icon may be stored in, for example, an internal memory mounted in the control unit 6, the image data output unit 13, or the like. Then, based on the image data containing the alert denotation data, the control unit 6 controls the DMD's 10, 11, 12, or the like, so as to produce an image containing the alert denotation. With this arrangement, the operator can readily recognize the possibility of occurrence of distortion, or the like, even when adjusting the position of a normal image being displayed, other than the test image. That is, the same advantage as that in the above embodiment can be obtained.

Further, any alerting method is applicable as long as it catches the operator's attention. For example, the whole or a part (the periphery, the outside frame, or the like) of the image shown may blink.

Alternatively, a light emitting device (an LED, or the like) for displaying an alert may be mounted to the main body of the projector apparatus 1. Still alternatively, a small liquid crystal panel may be mounted to display a caution, such as "WARNING!!". This arrangement is particularly effective when an adjustment is made using the adjustment button, or the like, on the main body of the projector apparatus 1.

Figure 7:
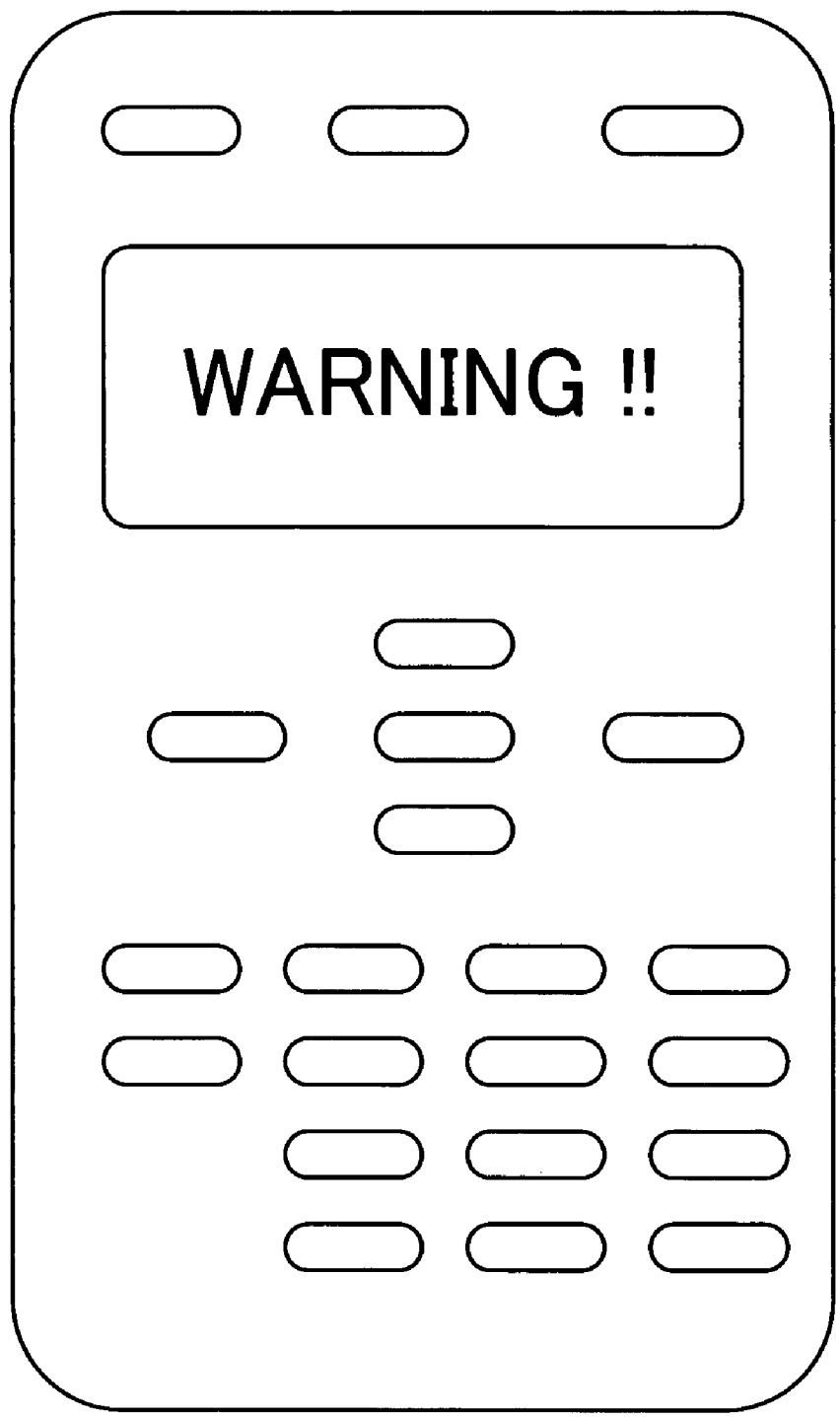
FIG. 7 is a diagram showing an example image displayed for alerting in a remote controller.

Still alternatively, the alert may be given to the operator via the remote controller 7. In this case, a remote controller 7 of a bidirectional communication type for exchanging a signal with respect to the interface of the projector apparatus 1 is employed. The remote controller 7 may have a liquid crystal image display or a light emitting device, for example, so as to display a caution, such as "WARNING!!", or the like, as shown as an example in FIG. 7, under control of the control unit 6. Alternatively, the light emitting device may emit light. Still alternatively, the remote controller 7 may have a vibrator, which may vibrate under control of the control unit 6 to alert.

With an alert given via the projector apparatus 1 or the remote controller 7, the operator can readily recognize the possibility of occurrence of distortion, or the like. That is, the advantage similar to that in the above-described embodiment can be achieved.

SECOND EMBODIMENT

In the following, a second embodiment of the present invention will be described while referring to the accompanying drawings. In the second embodiment, the distorted or blurred portion of the image, caused by sliding the image, is automatically deleted to some extent.

Figure 8:
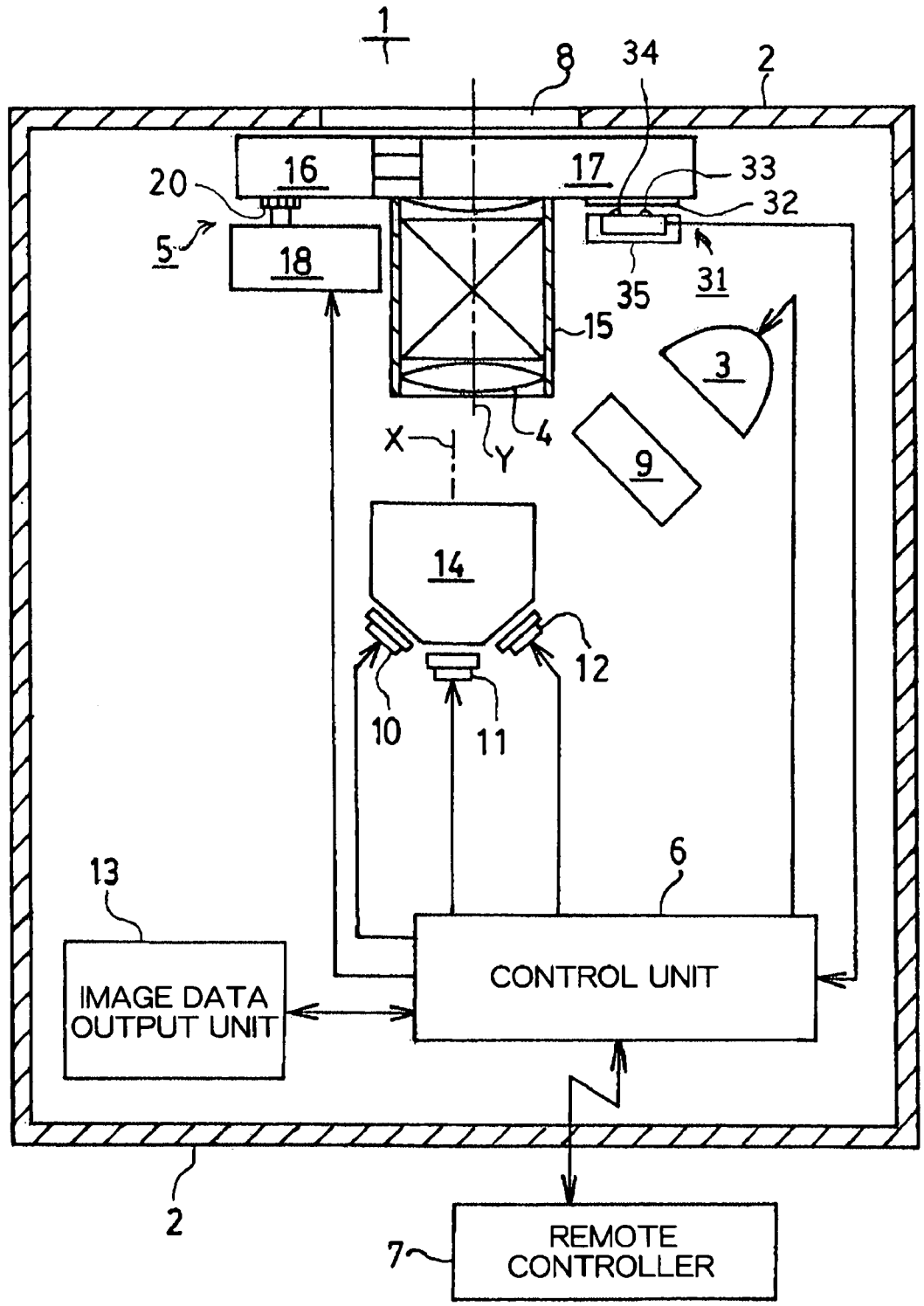
FIG. 8 is a plane disposition diagram showing a structure of a projector apparatus according to a second embodiment of the present invention.
Figure 9:
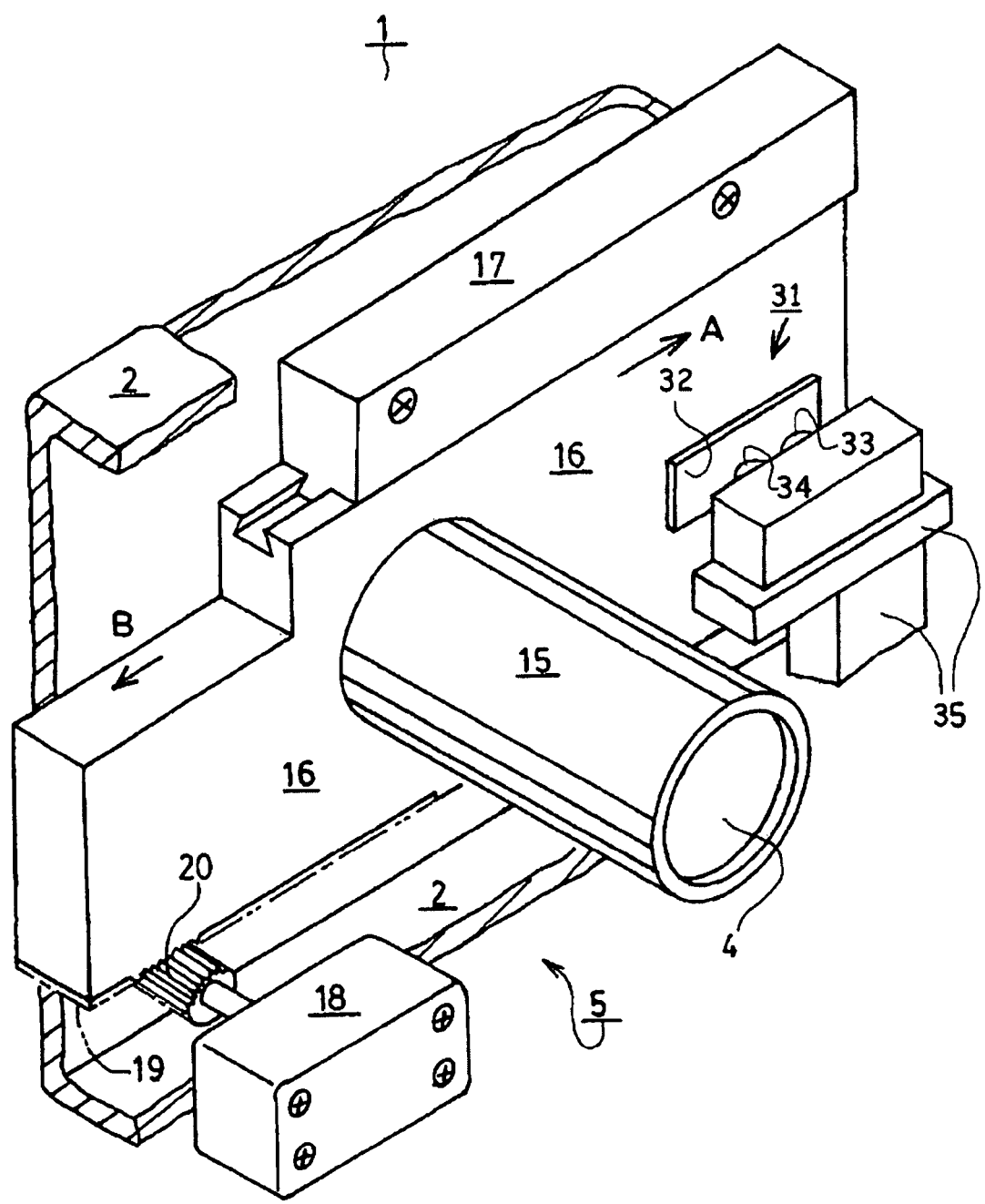
FIG. 9 is a perspective view showing a structure of a part of the projector apparatus, the part being in the vicinity of the lens of the projector apparatus according to the second embodiment of the present invention.

FIGS. 8 and 9 show a structure of a projector apparatus 1 according to the second embodiment of the present invention. In order to facilitate understanding, structural elements identical to those in FIG. 1 are given identical reference numerals, with detailed description not repeated here. The projector apparatus shown in FIG. 8 comprises a measurement unit 31 for measuring the slide amount of the slider member 16, instead of the elements, such as the limiters 21, 22, the pressing bodies 23, 24, and so forth, for detecting a predetermined slide amount of the slider members 16.

The measurement unit 31 comprises a scale body 32, a light emitting device 33, a light receiving element 34, and a holding member 35.

The scale body 32 comprises a flat panel member having a front surface with any pattern, such as a vertical strip grid, or the like, engraved thereon, and a depth surface serving as a reflection plane. The scale body 32 is mounted on the slider body 16, and thus moves as the slider member 16 moves.

The light emitting device 33 comprises an LED, or the like, and emits light for measurement toward the scale body 32. The light receiving element 34 detects the light emitted by the light emitting device 33 and reflected by the scale body 32.

The holding member 35 is fixedly mounted to the casing 2, and holds the light emitting device 33 and the light receiving element 34 so as to oppose the scale body 32.

The control unit 6 controls output of the light for measurement by the light emitting device 33. The light from the light emitting device 33 is reflected by the scale body 32 in a different manner depending on the surface shape of the scale body 32. The light receiving element 34 comprises a photoelectric conversion element, and produces a different signal depending on the property of the received reflected light, including, for example, the number of bright and dark portions due to the vertical strip grid of the scale body 32. The control unit 6 measures the slide direction and amount of the slider member 16 relative to the holding member 35, based on the signal from the light receiving element 34.

When it is determined based on the signal from the light receiving element 34 that the slider member 16 has slid by an amount exceeding a predetermined amount, the control unit 6 controls to display an image having the marginal portion thereof in the slide direction deleted by a predetermined width. Specifically, the control unit 6 controls the image data output unit 13 so as to output, for the image data to be displayed, image data about an image with a predetermined marginal portion thereof in the slide direction expressed in black (superimposed by black). Based on the signal from the image data output unit 13, the control unit 6 further controls the DMD's 10, 11, 12 so as to form desired image light. It should be noted that any color not giving an unconformable impression to the viewer may be superimposed onto the marginal portion of the original image, though black is preferable as the projector apparatus 1 is generally used in the dark. Alternatively, no image may be displayed in the area to be deleted. That is, the white light from the light source may be projected intact.

In one example, the control unit 6 determines, based on the signal from the light receiving element 34, whether or not the slider member 16 has slid in either direction by an amount exceeding 10 mm. Upon determination that the slider member 16 has slid by an amount exceeding 10 mm, the control unit 6 controls the DMD's 10, 11, 12, or the like, so as to delete the marginal portion of the image in the slide direction by a predetermined mount. The extent of deletion may be determined as a proportion relative to the entire image (for example, 5% of the entirety) or fixed (for example, 12 mm from the outside frame). The extent of deletion is predetermined within a range tolerable for the person viewing the image.

In the following, an operation of the projector apparatus 1 having the above-described structure will be described.

That is, the operator turns on the projector apparatus 1 installed in a desired place to display an image on the screen. In the above, the control unit 6 sends a drive signal to control the light source 3 so as to output white light. Based on the drive signal from the control unit 6, the light source 3 outputs the white light to the spectroscope 9. The spectroscope 9 divides the white light from the light source 3 into three light rays of red (R), green (G), and blue (B) before forwarding to the condenser 14. The control unit 6 sends also drive signals to the DMD's 10, 11, 12 for formation of an image based on the image data from the image data output unit 13.

The condenser 14 converges the image light from the DMD's 10, 11, 12 before forwarding the image light towards the lens unit 4. It should be noted that with the projector apparatus 1 in the initial state, the central line X of the luminous flux of the image light from the condenser 14 coincides with the optical axis Y of the lens unit 4. The lens unit 4 transmits the image light from the condenser 14 to thereby project the image light magnified by a predetermined factor.

Figure 10:
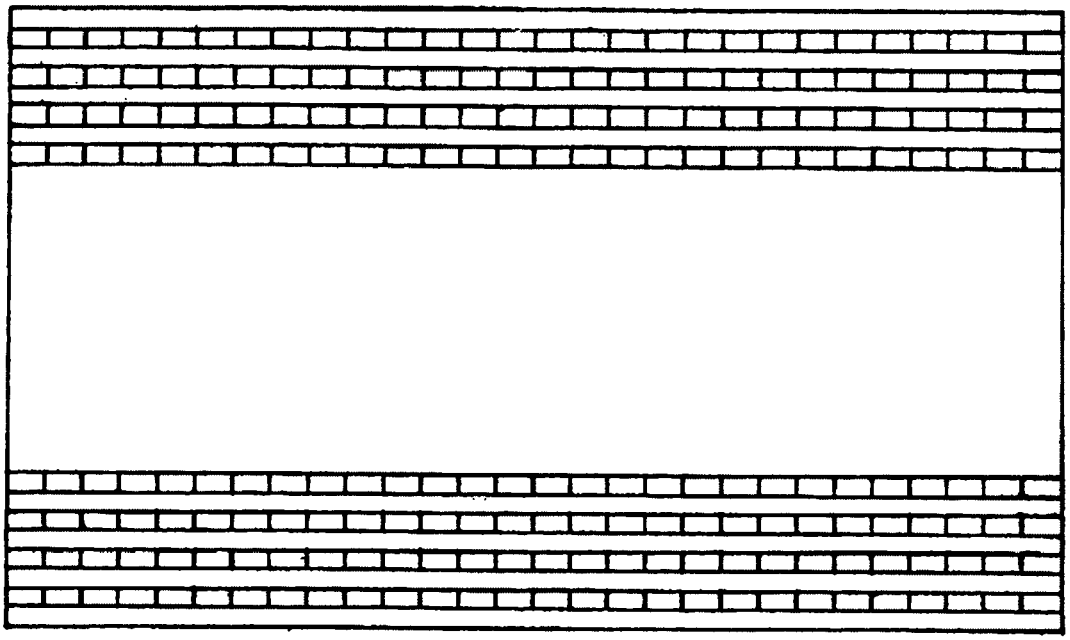
FIG. 10 is a diagram explaining an example image containing no distortion.
Figure 10:
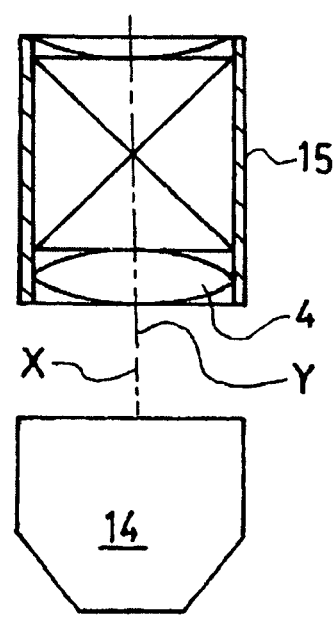

The operator viewing the image projected on the screen determines whether or not the image is located as they desire, that is, for example, within the disposed screen. In the above, with the central line X of the luminous flux of the image light from the condenser 14 coincident with the optical axis Y of the lens unit 4, that is, with there being no space between the central line X and the optical axis Y, no distortion and/or expanding blur appear in the image on the screen, as shown in FIG. 10.

With the image not located as desired, the operator viewing the image on the screen instructs the projector apparatus 1 to adjust the image, using the remote controller 7. For example, the operator may attempt to move the image on the screen by a desired distance in the direction A by inputting a control signal instructing such a movement via the remote controller 7. The control unit 6 receives the control signal, and controls the geared motor 18 so as to drive the pinion gear 20 by an amount corresponding to the desired distance. In response to the control signal received from the control unit 6, the geared motor 18 causes the pinion gear 20 to rotate, whereby the rack gear 19 is fed in the direction A.

With the rack gear 19 fed in the direction A, the barrel 15, integral with the rack gear 19, moves by the same distance in the direction A. Further, the lens unit 4, held by the barrel 15, also moves by the same distance in the direction A. Accordingly, the optical axis Y of the lens unit 4 moves by the same distance in the direction A relative to the central line X of the image light from the condenser 14, with the image position on the screen resultantly sliding by the amount corresponding to the movement in the direction A. The geared motor 18 having driven the pinion gear 20 by a predetermined amount stops driving, and the rack gear 19 stops moving apart from the pinion gear 20 in the direction A. Consequently, the barrel 15 also stops moving in the direction A. As described above, the image position on the screen is determined as desired by the operator, that is, in a position having slid in the direction A from the original position by a desired distance. When the operator wishes to move the image position in the direction B, the control unit 6 controls in the same manner.

The control unit 6 monitors, via the measurement unit 31, the slide amount of the slider member 16. When the operator keeps sliding the image position in the direction A, the isolation distance (the slide amount of the slider member 16) between the central line X of the luminous flux of the image light from the condenser 14 and the optical axis Y of the lens unit 4 varies due to the operation by the moving unit 5. The control unit 6 receives a signal in accordance with the slide direction and amount from the measurement unit 31, and determines by comparison whether or not the slide amount in either direction exceeds a predetermined amount.

With the slide amount not exceeding a predetermined amount, the control unit 6 controls the image data output unit 13 so as to display the entire image based on the original image data received, without deleting any portion of the image.

Meanwhile, with the slide amount in excess of a predetermined amount, the control unit 6 controls the image data output unit 13 so as to produce a signal, for the image data to be displayed, which corresponds to an image having the marginal portion thereof in the slide direction deleted by a predetermined amount. The control unit 6 controls the DMD's 10, 11, 12 based on the output image signal. For example, the control unit 6 controls the image data output unit 13 so as to output an image signal with the portion to be deleted, expressed in black.

The DMD's 10, 11, 12 receive the light from the spectroscope 9 and reflect the received light as image light toward the condenser 14, based on the signal corresponding to the image subjected to deletion, the signal sent from the control unit 6. The condenser 14 having received the image light from the DMD's 10, 11, 12 converges the light so as to form image light, and projects the image light via the lens unit 4 towards the screen.

The image light having passed through the lens unit 4 forms an image on the screen, the image having the marginal portion thereof deleted, this marginal portion being contained in the original image data output from the image data output unit 13.

Figure 12:
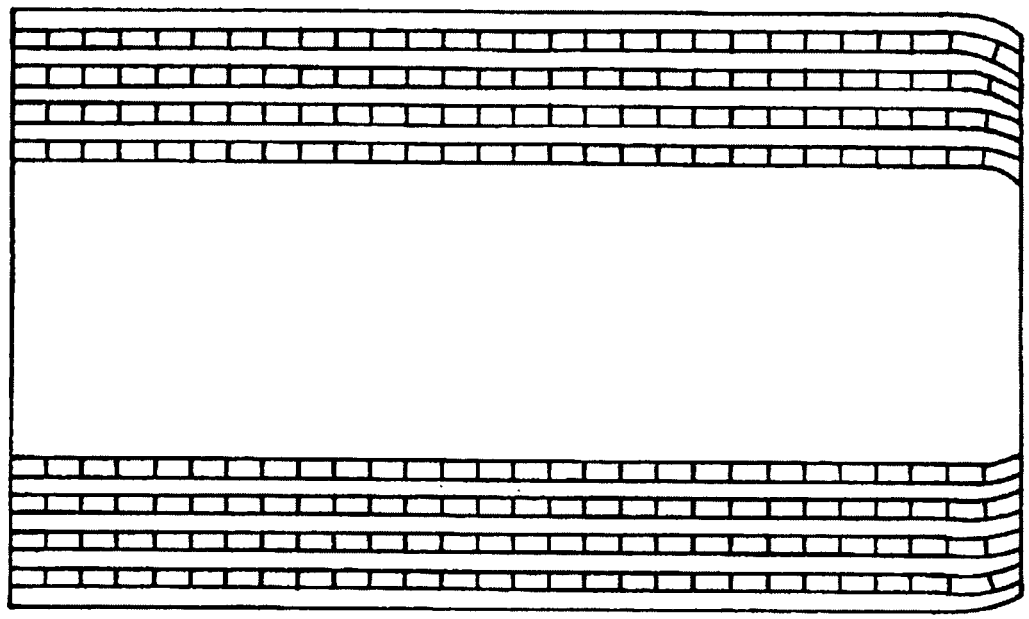
FIG. 12 is a diagram explaining an example image displayed with distortion.
Figure 12:
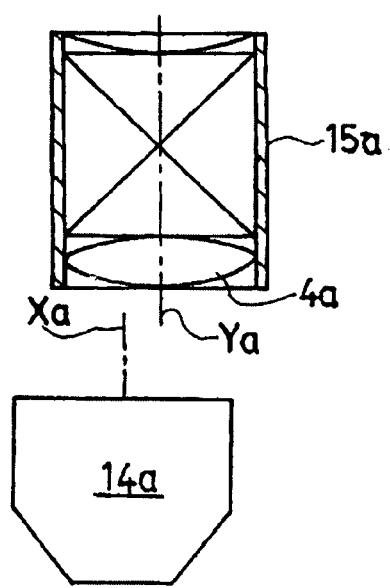

When the lens unit 4 slides excessively as the slider member 16 moves, the central line X of the luminous flux of the image light from the condenser 14 is displaced significantly from the optical axis Y of the lens unit 4, accordingly causing the image position to slide and thus go out of focus. In the above, the image on the screen has obvious distortion and expanding blur in the marginal portions thereof, in particular, the corner portion thereof in the slide direction, as shown in FIG. 12. (In FIG. 12, "a" is attached to the respective elements in order to explain an image not included in the second embodiment.) With the slider member 16 sliding further, a part of the light from the condenser 14 is directed anywhere other than the lens unit 4, and an image with parts missing thus results.

Figure 11:
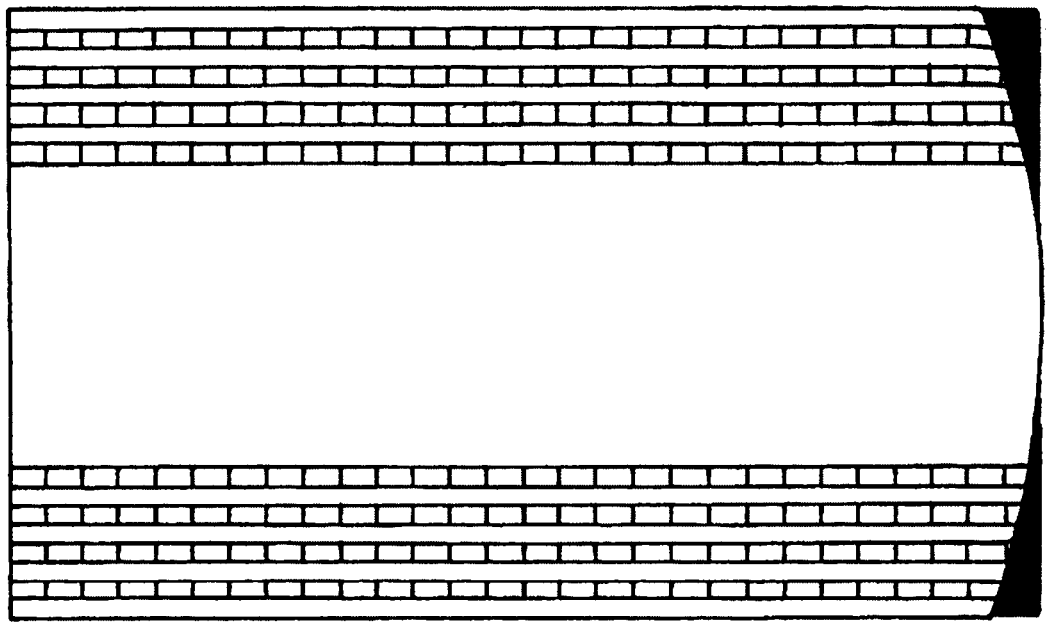
FIG. 11 is a diagram explaining an example image displayed with distortion deleted.
Figure 11:
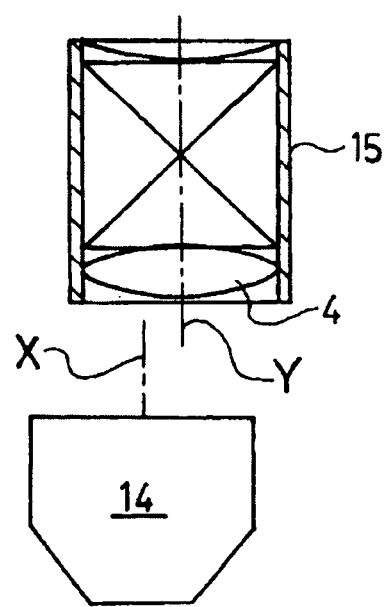

However, in the second embodiment, when the slider member 16 slides by an amount in excess of the predetermined amount, an image having the marginal portion thereof automatically deleted, which would otherwise be distorted, is shown. That is, the image shown in FIG. 12 but with the distorted and/or blurred portion thereof deleted, namely, the image such as is shown in FIG. 11, appears on the screen.

Therefore, the image shown on the screen does not contain distortion and expanding blur which are generally, empirically determined to be intolerable. This makes it possible to present to the viewer an image containing the minimum possible distortion and/or blur.

The viewer realizes that the shown image is substantially faithful to the image data from the image data output unit 13, and can rely on the shown image except the deleted portion. Meanwhile, a person who knows that the image may be distorted and/or blurred as a result of sliding the image on the screen does not feel any serious discomfort with the image obtained by the projector apparatus 1 as the image is free from distortion and expanding blur, and thus deformation.

The present invention is not limited to the above-described embodiment, and can be modified in various ways.

In the second embodiment, the measurement unit 31 detects the slide amount using a non-contact optical method. This, however, is not an exclusive example, and a physical method may be employed to determine a slide amount, similar to the first embodiment. Obviously, the optical method used in the second embodiment is applicable in the first embodiment. Alternatively, the slide amount may be determined based on the driving amount of the geared motor 18 or the instructed driving amount.

Further, the projector apparatus 1 may have a control function such that with the lens unit 4 sliding relative to the condenser 14 by means of the function of the moving unit 5, the control unit 6 stores distance data on the slide distance of the lens unit 4 supplied from the distance measurement unit 31, and with the image projection completed, outputs the distance data to moving unit 5 so as to return the lens unit 4 to the original position thereof based on the distance data, that is, to the position with the central line X of the luminous flux of the image light from the condenser 14 coincident with the optical axis Y of the lens unit 4.

In the first and second embodiments, the moving unit 5 horizontally moves the lens unit 4, and the central line X of the image light from the condenser 14 thus moves horizontally closer or further apart relative to the optical axis Y of the lens unit 4. This, however, is not an exclusive example. The moving unit 5 may move the lens unit 4 such that the relative distance between the lens unit 4 and the condenser 14 varies in the vertical or diagonal direction relative to the relative distance between the main body of the projector device 1 and the screen in use. In either case, a sensor, or the like, when mounted within a vertically or diagonally movable range, could produce the advantage similar to that in the above-described embodiments.

In the first and second embodiments, a structure of a reflection type employing the DMD's 10, 11, 12 is used. Alternatively, the projection apparatus 1 may comprise a liquid crystal display, or the like, for sending desired image light while transmitting or blocking the light from the light source.

In the first and second embodiments, the lens unit 4 can slide relative to the fixed condenser 14 by means of the moving unit 5. This, however, is not an exclusive example, and the condenser 14 may be slidable while the lens side may be fixed. Alternatively, the condenser 14 and the lens unit 4 may both be slidable.

INDUSTRIAL APPLICABILITY

This invention is effectively applicable to a projector apparatus, in particular, a projector apparatus capable of moving a position on a screen, where an image is projected.

The invention claimed is:

1. A projector apparatus, comprising:
   a light converging unit for converging image light for formation of a predetermined image;
   a lens unit for passing through the image light from the light converging unit so that an image of a predetermined magnification is displayed on a screen;
   a moving unit for changing a relative distance between the light converging unit and the lens unit to adjust a position of the image displayed on the screen by the lens unit; and
   a control unit for determining whether or not the relative distance changed by the moving unit exceeds a predetermined amount.

2. The projector apparatus according to claim 1, further comprising a detection unit for outputting a signal when the relative distance exceeds the predetermined amount, wherein the control unit determines whether or not the relative distance exceeds a predetermined amount, based on the signal output from the detection unit.

3. The projector apparatus according to claim 1, further comprising a measurement unit for detecting the relative distance, wherein the control unit determines whether or not the relative distance detected by the measurement unit exceeds a predetermined amount.

4. The projector apparatus according to claim 1, wherein an alert is put out when the control unit determines that the relative distance exceeds the predetermined amount.

5. The projector apparatus according to claim 1, wherein an image containing an alert is displayed when the control unit determines that the relative distance exceeds the predetermined amount.

6. The projector apparatus according to claim 1, wherein an image having a predetermined area thereof deleted is displayed when the control unit determines that the relative distance exceeds the predetermined amount.

7. The projector apparatus according to claim 1, wherein an image having a predetermined area thereof expressed in black is displayed when the control unit determines that the relative distance exceeds the predetermined amount.

* * * * *